(12) United States Patent
Deem et al.

(10) Patent No.: US 6,972,709 B1
(45) Date of Patent: Dec. 6, 2005

(54) RADIO FREQUENCY TRANSCEIVER

(75) Inventors: Jake Deem, Colorado Springs, CO (US); Terry B. Wilson, Chandler, AZ (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/227,895

(22) Filed: Aug. 26, 2002

(51) Int. Cl.[7] ............................................. G01S 13/00
(52) U.S. Cl. ........................ 342/70; 342/175; 342/205
(58) Field of Search ...................... 342/62, 70, 127, 342/128, 200, 89, 98, 102, 103, 118, 120–124, 342/175, 205; 324/329, 136; 340/310.06

(56) References Cited

U.S. PATENT DOCUMENTS

| | | | | |
|---|---|---|---|---|
| 5,127,102 A | * | 6/1992 | Russell | ........................ 455/327 |
| 5,263,194 A | * | 11/1993 | Ragan | ......................... 455/316 |
| 5,726,657 A | * | 3/1998 | Pergande et al. | ............ 342/202 |
| 6,088,581 A | * | 7/2000 | Bickley et al. | .............. 455/131 |
| 6,405,022 B1 | * | 6/2002 | Roberts et al. | ............... 455/76 |
| 6,486,826 B1 | * | 11/2002 | Cramer et al. | .............. 342/124 |
| 2002/0103013 A1 | * | 8/2002 | Watson et al. | .............. 455/562 |
| 2002/0196178 A1 | * | 12/2002 | Beard | .......................... 342/42 |
| 2004/0012517 A1 | * | 1/2004 | Abou-Jaoude et al. | ....... 342/165 |

* cited by examiner

Primary Examiner—Thomas H. Tarcza
Assistant Examiner—Isam Alsomiri
(74) Attorney, Agent, or Firm—Rader, Fishman & Grauer PLLC

(57) ABSTRACT

A transceiver that includes a radio frequency source comprised of a monolithic millimeter wave integrated circuit. The transceiver generates a signal of a first frequency, which is then converted to a signal of a second frequency as the signal is conveyed through the transceiver. The value of the second frequency exceeds that of the first frequency.

11 Claims, 3 Drawing Sheets

RADIO FREQUENCY TRANSCEIVER

TECHNICAL FIELD OF THE INVENTION

The present invention relates generally to a transceiver, and, more specifically, a transceiver that uses monolithic millimeter wave integrated circuitry ("MMIC").

BACKGROUND OF THE INVENTION

Radar systems are used in a variety of applications. One fast-emerging application for radar systems is in connection with automotive collision warning systems that warn a driver of impending collisions between the driver's vehicle and other objects using a visual or audible signal. Some collision warning systems further include the ability to assist the driver to avoid the impending collision by automatically adjusting the vehicle's speed or direction without intervention from the driver. Yet another emerging application for radar systems includes adaptive cruise control applications wherein a vehicle's cruise control speed can be automatically adjusted in response to the detection of one or more other proximate vehicles on the road. In addition to these applications, one skilled in the art would recognize many other applications for radar systems, both in connection with automotive applications and otherwise.

Regardless of the specific application, many radar systems use a transceiver (combination of a transmitter and receiver) in connection with an antenna to transmit and receive information. For example, in the case of one type of automotive radar system, a transceiver causes an antenna to project a beam of energy outwardly from the vehicle. Physical objects in the path of the energy beam cause the energy beam (or a portion thereof) to be reflected back toward the vehicle, which is received by the antenna and transceiver. To be effective, the transceiver should be capable of a high degree of accuracy in its ability to detect reflected energy beams. However, in many instances, transceivers must endure harsh physical conditions, such as shocks, vibrations, and varying environmental conditions, including temperatures ranging from −40° to 100° C. These harsh physical conditions may affect the accuracy and reliability of the transceiver. Thus, radar transceivers preferably are highly precise devices that can withstand demanding physical environments. Further, radar transceivers are preferably cost-effective to ensure the marketability of the overall radar system.

One known transceiver that has been used in connection with some radar systems is referred to as a frequency modulated continuous wave (FMCW) transceiver. FMCW transceivers generally include a radio frequency (RF) source that generates an RF signal or electrical energy beam, which is transmitted outwardly through an antenna. A common RF source used in FMCW transceivers is known as a "Gunn" oscillator. The FMCW transceiver also includes a device that generates an electrical waveform signal, which is used to initiate and control the RF energy source, and thus the electrical energy signal generated thereby. Reference oscillators, and particularly dielectric reference oscillators, are commonly used as the waveform-generating device in FMCW transceivers. Finally, the RF source ("Gunn" oscillator) and the waveform-generating device (dielectric reference oscillator) are connected through a phase loop circuit. The purpose of the phase loop circuit is to compare the signal generated by the RF source with the electrical waveform signal used to initiate and control the RF source. When they differ, the RF source is adjusted so that its output signal more closely resembles the waveform signal. This provides a form of feedback control for the RF energy source.

The above-described known transceiver has several shortcomings. First, the waveform signal generated by a dielectric reference oscillator can be significantly non-linear. As a result, the waveform signal generated by the dielectric reference oscillator is not an accurate representation of the original reference signal that is inputted into the dielectric oscillator: Second, Gunn oscillators and dielectric reference oscillators are notoriously hard to calibrate and often exhibit poor reliability when subject to non-static environmental conditions, such as temperature variances. Third, Gunn oscillators and dielectric reference oscillators are relatively expensive, particularly when they are designed to operate at relatively high frequencies, such as is required in automotive radar systems (i.e., 76–77 GHz). Finally, Gunn oscillators and dielectric reference oscillators suffer from significant phase noise, thereby diminishing their detection capabilities.

In light of the above-described shortcomings and others, the inventors hereof have recognized the need for an improved transceiver.

SUMMARY OF THE INVENTION

The present invention relates to a new transceiver circuit and method for generating a radio frequency (RF) signal in a radar system. In particular, the inventive transceiver uses a monolithic millimeter wave integrated circuit ("MMIC") as the RF source to generate an RF signal. The RF signal generated by the monolithic millimeter wave circuit has a frequency that is lower than that which is ultimately transmitted from the radar system. The RF signal is provided to a multiplier circuit, which increases the frequency of the RF signal. The multiplied RF signal is transmitted from the radar system.

DETAILED DESCRIPTION OF A PREFERRED EMBODIMENT

Figure 1:
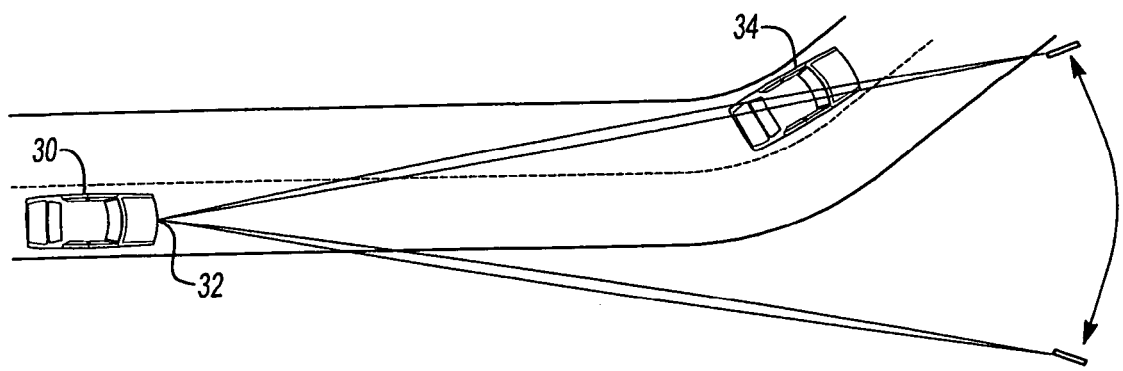
FIG. 1 is an illustration of one environment wherein the present invention could be beneficially utilized.

FIG. 1 illustrates one environment in which the present invention could be beneficially utilized. A traveling vehicle 30 has a vehicular collision warning system 32 mounted at a front portion of the vehicle body. The collision warning system emits a forward signal, such as a radar wave, from the vehicle and also receives a reflected wave from an obstacle, such as another vehicle 34, which is driving towards or away from vehicle 32. The collision warning system measures the distance between the traveling vehicle 30 and the other vehicle 34. If the system detects an object directly in front of the traveling vehicle, it automatically activates an alarm or adaptively controls the vehicle by, for example, activating a brake to supply a braking force to the vehicle's wheels. Thus, the vehicular collision warning system notifies the driver of an impending collision and/or initiates evasive action to avoid a collision or actively adjusts the vehicle speed to maintain a time headway to the closest in path object. Warnings may be visual, auditory, or tactile and the vehicle control actions may include braking, throttle control, transmission control and evasive steering.

Figure 2:
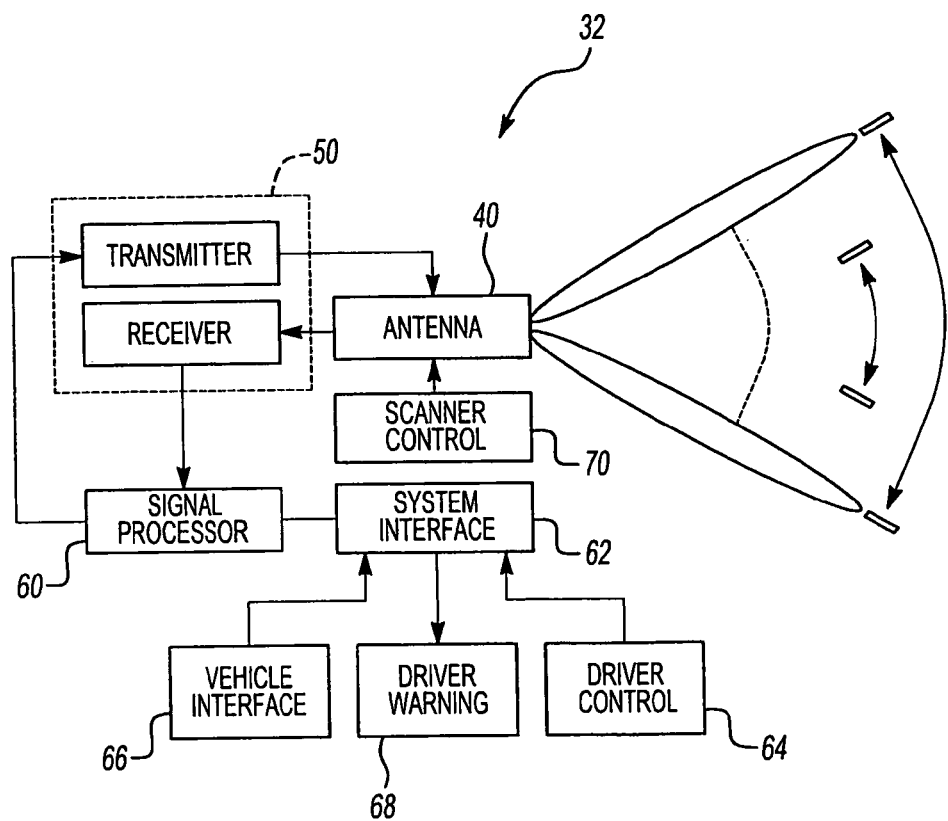
FIG. 2 is a schematic block diagram of a vehicular collision warning system into which the present invention can be incorporated.

FIG. 2 is a basic illustration of the forward looking vehicle collision warning system 32, as referred to above, which would benefit from the use of the transceiver that is the subject of the present invention. Warning system 32 is preferably provided with a rotatable antenna structure 40 that may be in the form of a slotted wave-guide antenna. A scanner control 70 drives antenna 40 so that it oscillates back and forth. A transceiver 50, such as the one described by the present invention, is coupled to the antenna 40. Radar signals generated by the transceiver 50 are then passed through the antenna and transmitted to and reflected back from a target as the antenna is oscillated back and forth. The reflected signals are received by the antenna 40 and then directed back to transceiver 50, which detects and isolates the appropriate signals based upon their frequency. These scanned signals are then directed to a signal processor 60, which analyzes the signals to determine their significance, i.e. an imminent collision with an approaching vehicle. The signal processor 60 communicates with a system interface 62, which allows the warning system 32 to interact with the vehicle. A vehicle interface 66 communicates with system interface 62 to provide information regarding the state of the vehicle, such as its current speed and whether the brakes have been activated, which is typically obtained through various sensors and other devices for detecting vehicle operations. Based on the information from the signal processor 60 and vehicle interface 66, the system interface 62 outputs signals to a driver warning or adaptive control 68. The driver warning or adaptive control 68 issues an audible or visual alert and/or initiates an action, such as applying the vehicle brake, upon the system detecting a possible dangerous condition. Lastly, a driver control 64 allows the drivers to activate and control the vehicle collision warning system 32. The driver control 64 commonly comprises control buttons or knobs in the vehicle passenger compartment.

While the above-described environment is used to illustrate at least one application of the inventive transceiver, it should be understood that the invention hereof can be used in a variety of environments, including various radar systems used for automotive applications or otherwise.

Figure 3:
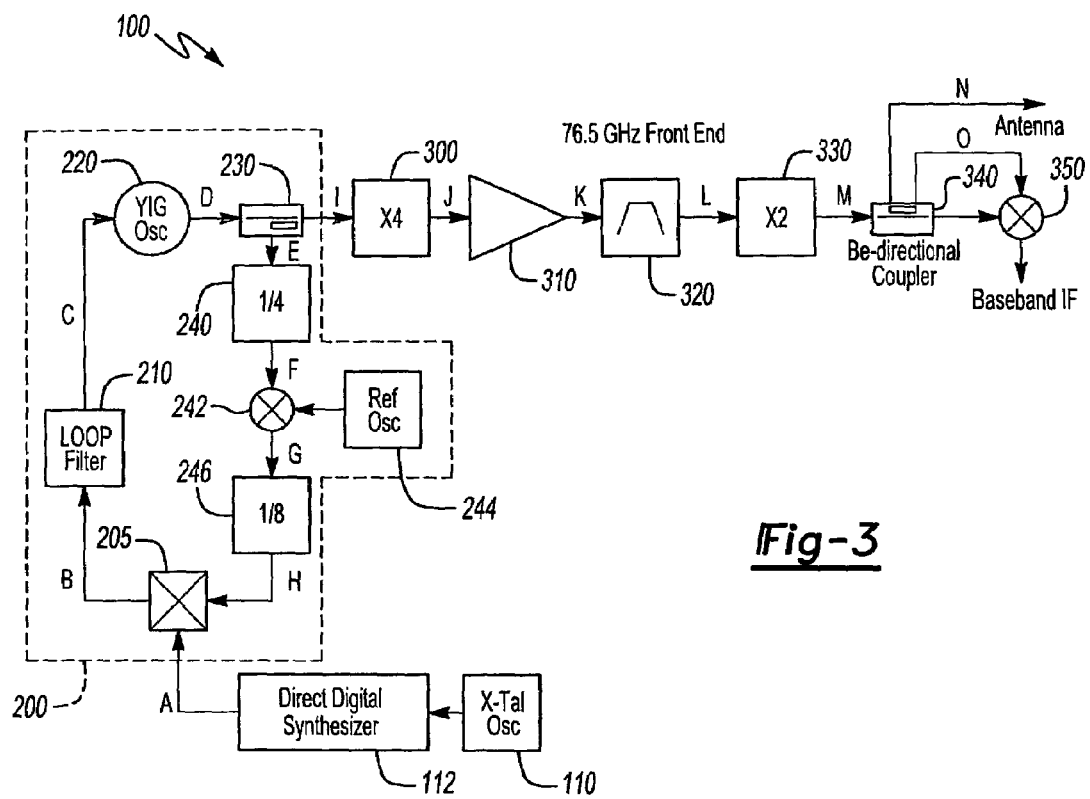
FIG. 3 illustrates a transceiver according to one embodiment of the present invention.

FIG. 3 illustrates a transceiver system 100 according to a first embodiment of the present invention. A crystal oscillator 110 generates a reference signal that is forwarded to digital synthesizer 112. The digital synthesizer 112 then generates a waveform signal (A) that is applied to a phase-locked loop ("PLL") circuit 200. In the embodiment of the invention described in FIG. 3, the PLL circuit consists of a phase detector 205, a loop filter 210, an RF source 220, a router 230, a mixer 242 and associated reference oscillator 244, and first and second dividers, numbered 240 and 246 respectively.

The waveform signal (A) generated by digital synthesizer 112 is received by a phase detector 205. A signal (B) generated by phase detector 205 passes through the loop filter 210 and continues on as signal (C) to an RF source 220. In the current embodiment, RF source 220 is comprised of an oscillator based upon monolithic millimeter wave integrated circuitry ("MMIC"). An RF signal (D) generated by RF source 220 is routed to two different devices residing on two different circuit paths of the radar system. The routing of signal (D) is accomplished by a routing device 230, such as directional coupler.

Signal (I) continues on to a multiplier 300 and then on to an amplifier 310 and filter 320. From here, the signal proceeds to a second multiplier 330 and then through a bi-directional coupler 340, which routes the RF signal to a mixer 350 and the antenna (not shown).

Signal (E) remains in the PLL circuit by being directed to a divider 240. The output from this device proceeds to a mixer 242 and then onto another divider 246. The output of this divider 246 is then directed back to the phase detector 205.

Figure 4:
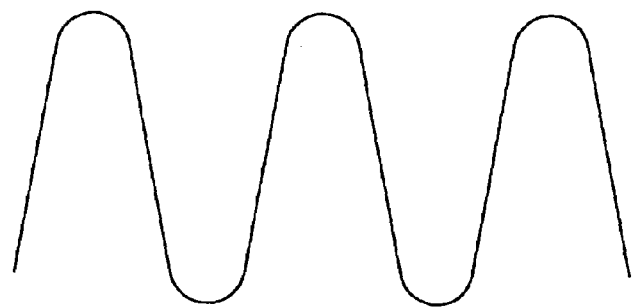
FIG. 4 illustrates one type of waveform signal generated by a digital synthesizer.

The general operation of the transceiver system 100 will now be described. Based upon a reference signal generated by a crystal oscillator 110, the digital synthesizer 112 produces a frequency modulated (FM) waveform signal (A). A sample of an FM waveform that is useful in this invention is shown in FIG. 4. This FM waveform (A) is the first of two signals applied to the PLL circuit 200. The second signal (H), described in more detail hereinafter, is a feedback signal used to help maintain the appropriate frequency of signal (D) generated by RF source 220. Based on a comparison of signal. (A) and signal (H), which is a derivative of signal (E), the phase detector 205 generates a signal (B) that passes through loop filter 210, for removal of unwanted elements or noise associated with signal (B), and then directed as signal (C) to the RF source 220. It is this signal (C) applied to RF source 220 that determines the frequency of signal (D) generated by the RF source 220.

In traditional transceivers utilized in radar and other similar applications, the RF signal would be generated at a frequency equal to that of the final RF signal projected from the antenna. For example, in a vehicle radar system that requires a final RF signal of 76–77 GHz to be projected from the antenna, the initial signal generated by the RF source of the traditional transceiver would typically be 76–77 GHz.

Unlike traditional transceivers, the transceiver of the present embodiment utilizes an MMIC-based low frequency oscillator as its RF source 220. Continuing on with the vehicle radar system example above, the MMIC-based oscillator generates a signal (D) having a frequency that is lower than the ultimate desired frequency, which, in the case of automobile radar systems, is 76–77 GHz. For example, the MMIC-based low frequency oscillator 220 may generate a signal (D) on the order of 9–10 GHz.

Once generated, the RF signal is diverted along two separate paths by routing device 230. Signal (E) remains within the phase locked loop ("PLL") circuit and will be discussed below, while signal (I) is directed on to a first multiplier 300. The purpose of the multiplier 300 is to increase the frequency of signal (I). In a vehicle radar system that initially generates a signal (D) of 9–10 GHz, for example, this first multiplier 300 could be a 4× multiplier that increases the 9–10 GHz frequency of signal (I) to 36–40 GHz, now labeled as signal (J). This new signal (J) is higher in frequency than the original signal (D) generated by the MMIC-based oscillator 220, but still lower in frequency than that required for a final RF signal. Signal (I) is then passed on to an amplifier 310 and a filter 320. This increases the power level of signal (J) and filters out any undesired harmonics that may have been introduced by the first multiplier 300. The subsequently amplified and filtered signal (L) is directed to a second multiplier 330, which, again, is intended to increase the frequency of signal (L). For example, this second multiplier 330 could be a 2× multiplier that would increase the 36–40 GHz frequency of signal (L)

to the appropriate 76–77 GHz range. This 76–77 GHz signal (M), being of the appropriate frequency, is passed through a bi-directional coupler 340, which routes signal (M) to two different destinations. Signal (N) is directed to the antenna, which projects the signal (N) outward to detect oncoming objects in the path of the vehicle. The second output of bi-directional coupler 340 is signal (O), which is essentially signal (M) carried through to mixer 350.

Upon encountering objects within its path, signal (N) is reflected back to the transceiver system 100. This reflected signal is then picked up by the antenna, where it is directed through the bi-directional coupler 240 to mixer 350. Mixer 350 compares this reflected signal to the original signal (O), which is transmitted out through the antenna as signal (N). By specific mathematical operations, the mixer 350 essentially subtracts one of these signals from the other, thereby obtaining a beat frequency that represents the amount of time it took for the original signal to travel out to an object, be reflected, and travel back to the transceiver system 100.

Figure 5:
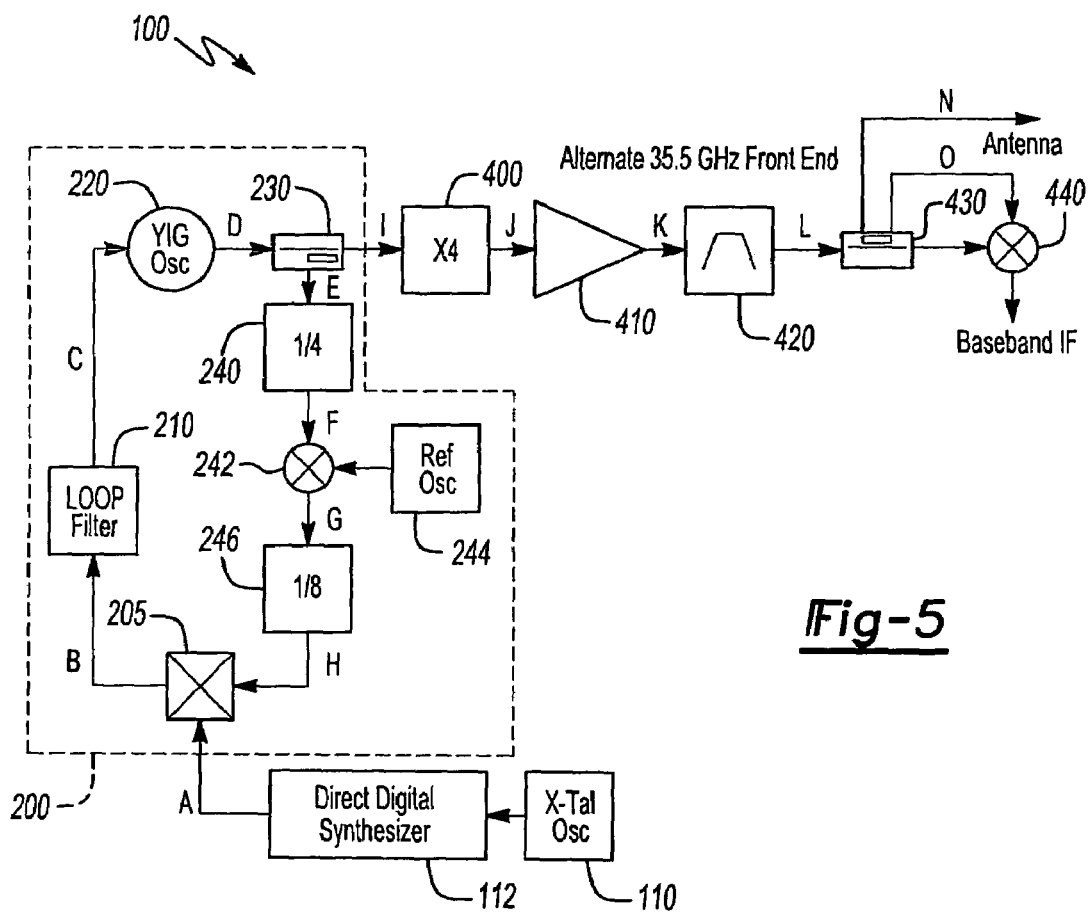
FIG. 5 illustrates a transceiver according to an alternate embodiment of the present invention.

In an alternative embodiment, if the final signal (N) of the system is not required to be of such a high frequency, the use of a second multiplier 330 could be eliminated. Thus, as indicated by the alternate circuit path illustrated in FIG. 5, signal (I) passes through a first and only multiplier 400 and then is directed through an amplifier 410, filter 420, etc., as in the previous example. Accordingly, it is seen that virtually any frequency signal can be obtained through the appropriate combination of a MMIC-based low frequency oscillator (as the RF source) and one or more multipliers.

Turning attention back to the phase detector 205, it was indicated above that it receives two input signals (A) and (H). The first signal (A) is a waveform generated by the digital synthesizer 112. The second signal (H) applied to the phase detector 205 functions as a feedback signal and is a derivative of signal (D) generated by RF source 220. Specifically, after being generated by RF source 220, the signal (D) is routed to two different paths by routing device 230. The first of these two paths carry signal (I), which is directed to the antenna as discussed above, while the second signal (E) is kept within the PLL circuit. This second signal (E) is applied to a divider 240 that decreases the frequency of the signal, for example, to $1/4^{th}$ of its original value. The resultant lowered frequency signal (F) then feeds into a mixer 242, where it is combined with a reference signal generated by a reference oscillator 244. The reference oscillator 244 is an MMIC-based low frequency oscillator like the one utilized by RF source 220. Mixer 242 essentially performs a down conversion process, whereupon the reference signal is subtracted from signal (F) to obtain an even lower frequency signal (G).

After the mixer 242, new signal (G) passes onto a second divider 246 which again reduces the frequency of the signal being passed through it, for instance, to $1/8^{th}$ of its value. The resultant low frequency signal (H) is then input into the phase detector 205 as the second of its input signals.

The phase detector 205 then compares the two signals (A) and (H) and generates an output signal (B) that is a measure of their phase difference. If the frequency of the waveform signal (A) generated by digital synthesizer 112 does not equal the frequency of signal (H) derived from the output of RF source 220, a phase-error signal (B) is generated by phase detector 205. In response to this phase-error signal (B), RF source 220 will adjust its output so that the frequency of its output signal (D) that it generates will tend toward the frequency of the waveform signal (A) generated by the digital synthesizer 112. Under ideal conditions, signal (D) generated by RF source 220 will "lock" into and track signal (A) generated by digital synthesizer 112, thereby maintaining a fixed phase relationship between the two signals.

There are several advantages obtained with the use of the transceiver of the present invention. First, the use of a digital synthesizer 112 to generate the waveform signal (A) that is applied to phase detector 205 results in the elimination of non-linearities within the RF signal generated and transmitted by the system. This is because RF signal (D) mirrors the waveform signal (A), so that the presence or absence of noise within the signal (A) generated by digital synthesizer 112 will be similarly present or absent in the RF signal (D) generated by RF source 220.

A further performance advantage is obtained through the use of multipliers within the transceiver system to increase the frequency of a signal. By utilizing one or more multipliers, the transceiver is not required to generate an initial high frequency signal, but instead can work with low frequency signals. This use of one or more multipliers allows the use of a low frequency MMIC-based oscillator as the RF source. An advantage of low frequency MMIC-based oscillators is that they have an inherently higher quality factor (Q factor) associated with them compared to higher frequency Gunn oscillators. Generally, a higher Q factor relates to improved performance. Specifically, as the Q factor for an oscillator circuit increases, the more selective the oscillator becomes, only generating current signals within a more focused frequency bandwidth. The end result is that an oscillator with a high Q factor generates a more accurate signal with less system noise associated with it. Thus, by allowing the use of lower frequency, higher Q factor oscillators, the transceiver of the present invention is capable of increased performance, which in turn provides for a radar system with greater accuracy and range.

The benefits just described can be further appreciated by using a low frequency, high Q factor oscillator not only for the RF source 220, but also for the reference oscillator 244. Unlike the prior art, which initially generates a high frequency signal, a much lower frequency signal (D) is generated by the RF source 220 of the present invention. By starting with an already low frequency signal, and then applying it to a divider 240, an even lower frequency signal (F) is delivered to mixer 242 for combining with a reference signal. This permits the use of a low frequency MMIC-based oscillator as reference oscillator 244, which as described above, provides for a higher Q factor and improved performance.

Beyond improved performance, the use of MMIC-based oscillators operating at lower frequencies also leads to decreased production and sales costs. High frequency microwave components, such as Gunn diode-based oscillators operating in the 76–77 GHz range, are expensive to produce and maintain compared to the lower frequency MMIC-based oscillators. Thus, by minimizing the number of costlier high frequency microwave components required in the transceiver, costs can be reduced, providing greater commercial viability.

Although the present invention is described primarily in reference to a motor vehicle radar system, it should be understood that this is by way of illustration and not of limitation, and thus the scope of the appended claims should be construed as broadly as the prior art will permit. The Applicants' novel approach of utilizing MMIC-based RF sources, along with the method of generating low frequency signals that can later be stepped up in frequency to satisfy the requirements of a specific application, can be easily adapted to a variety of other applications utilizing RF transceivers.

What is claimed is:

1. A transceiver, comprising:
   a radio frequency (RF) source for producing a signal of a first frequency;
   means for diverting at least a portion of said signal of a first frequency through at least a portion of a phase-locked loop (PLL) circuit for controlling a frequency of said RF source;
   a divider for converting said signal of a first frequency to a fourth frequency as it passes through said at least a portion of said PLL circuit, wherein said fourth frequency is lower than said first frequency;
   means for mixing said signal of said fourth frequency with a reference signal generated by a reference oscillator; and
   a phase detector that compares a signal derived from said mixing means to a frequency modulated reference signal.

2. The transceiver according to claim 1, further comprising a first multiplier for converting said signal of a first frequency to a second frequency, wherein said second frequency is higher than said first frequency.

3. The transceiver according to claim 1, further comprising a second multiplier for converting said signal of said second frequency to a third frequency, wherein said third frequency is higher than said second frequency.

4. The transceiver according to claim 1, wherein said RF source is comprised of a monolithic millimeter wave integrated circuit (MMIC).

5. The transceiver according to claim 4, further comprising a digital synthesizer for generating a frequency modulated waveform applied to said PLL circuit.

6. The transceiver according to claim 4, further comprising:
   an amplifier for increasing a strength of said signal of a second frequency; and
   a filter for removing unwanted harmonics within said signal of said second frequency.

7. The transceiver according to claim 1, wherein said reference oscillator is comprised of a monolithic millimeter wave integrated circuit (MMIC).

8. A method of generating a radio signal for a radar system, comprising:
   generating a radio signal of a first frequency with a monolithic millimeter wave integrated circuit;
   diverting a portion of said signal of said first frequency though at least a portion of a phase-locked loop (PLL) circuit;
   converting said first frequency of said signal diverted through at least a portion of said PLL circuit to a third frequency, wherein said third frequency is less than said first frequency;
   mixing said signal of said third frequency with a reference signal generated by a reference oscillator; and
   comparing said mixed signal to a frequency modulated reference signal.

9. The method according to claim 8, further comprising the steps of:
   converting said first frequency of said signal to a second frequency, wherein said second frequency is greater than said first frequency; and
   transmitting said signal of a second frequency through an antenna to detect objects within a path of said radar system.

10. The method according to claim 8, further comprising a phase detector for comparing said signal of a third frequency to a reference signal.

11. The method according to claim 10, wherein an output signal from said phase detector influences the value of said first frequency.

* * * * *